No. 898,057. PATENTED SEPT. 8, 1908.
J. W. MEIXELL.
WHEEL.
APPLICATION FILED FEB. 17, 1906.
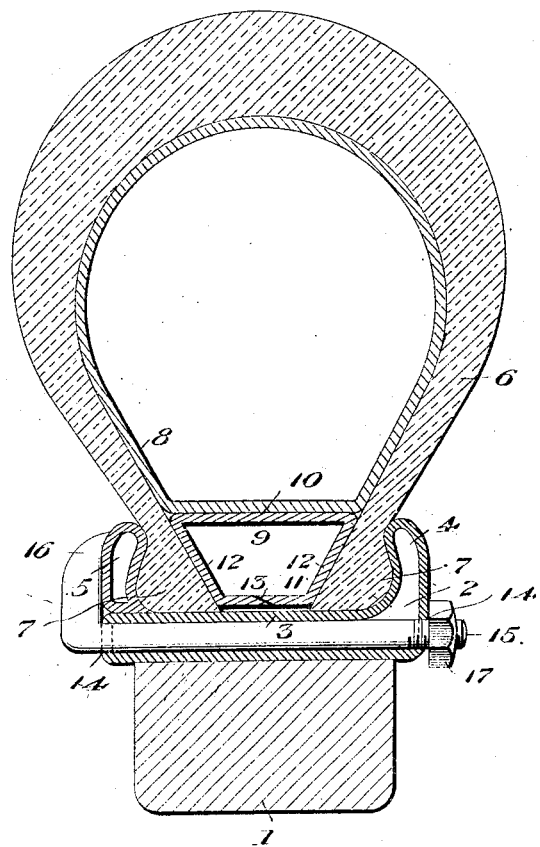
WITNESSES:
Wm C. Dashiell
C. F. Duvall
INVENTOR
John W. Meixell
BY W. Duvall
Attorney

UNITED STATES PATENT OFFICE.

JOHN W. MEIXELL, OF LEWISBURG, PENNSYLVANIA.

WHEEL.

No. 898,057.   Specification of Letters Patent.   Patented Sept. 8, 1908.

Application filed February 17, 1906. Serial No. 301,596.

*To all whom it may concern:*

Be it known that I, JOHN W. MEIXELL, a citizen of the United States, residing at Lewisburg, in the county of Union and State of Pennsylvania, have invented a new and useful Wheel, of which the following is a specification.

This invention relates to improvements in wheels, and has particular reference to that class of wheel employed in connection with the motor-car or automobile.

The objects of the invention are to provide a new and improved means for securing the tire upon the wheel; and to this end the invention may be said to consist in a ring employed internally with relation to the casing of the tire and conforming at its sides to the internal surfaces or walls of the tire-base and of somewhat greater diameter than the rim of the tire, and, therefore, when used in connection with a tire clamping means, to be capable of automatically adjusting itself to any uneven pressure exerted by said tire clamping means, with the result that a secure and uniform clamping pressure is secured entirely around the wheel.

The invention further consists in so constructing said ring as to render it capable of contraction and expansion laterally, whereby it will adapt itself to any variations in thickness of the bases in tires of different makes, and also to support the tire and prevent rim cutting when the tire has become deflated from puncture or other causes. And finally, the invention may be said to consist in a hollow or tubular rim so constructed as to lend strength and rigidity as well as secure lightness in weight, and in providing for the passage therethrough of the usual clamping-bolts, all as will more specifically hereinafter appear and be pointed out in the claims.

Referring to the drawing, in which I have represented a portion of my improved wheel in transverse section, 1 designates the felly, and 2 the tubular steel rim, though, as will hereinafter appear, the rim may be of other form and construction, if preferred. In the present instance, however, the rim is tubular or hollow, and comprises a central flat outer tread-portion 3, an upturned and inwardly curved wall 4, at one edge, and at the opposite edge or side, a removable clamping ring 5, also preferably tubular, of a diameter adapting it to snugly fit over the rim at the edge opposite which the wall 4 is located, and having an inner formation corresponding to that of the aforesaid wall. It will be understood that the inner surfaces of the wall 4 and the ring 5 approximate in contour or shape the external surfaces of the tire-base, as is usual in this class of mechanically fastened tires, and hence, the form or contour of the wall and ring may be otherwise than is herein shown.

6 designates the casing of the tire, the base of which has the internal inclined walls or surfaces shown and the external beads 7, the latter being engaged by the wall 4 and corresponding clamping-ring 5.

Within the casing is the usual inner tube 8, and the same is supported by the outer flat wall of what I term an automatically or self-adjusting floating-ring 9, that is interposed within the space bounded by the tire-rim, inner tube, and the opposite inclined walls of the base of the casing. This floating-ring may be solid, but I prefer, for reasons hereinafter apparent to make the same tubular, and in cross-section, somewhat wedge-shaped. In the present instance, therefore, it may be said to consist of an outer flat tread or base 10, an inner narrower wall 11, and opposite inclined connecting walls 12, the latter two converging toward the inner wall 11. In order, also, that this ring may be rendered capable of compression, I may provide an inclined slit 13 longitudinally or annularly disposed throughout the inner wall 11, or, in other words, form the inner wall 11 in two parts the meeting edges of which would preferably overlap and constitute a slip-joint, or any other construction may be substituted that will accomplish the object without materially weakening the ring.

A peculiarity of the ring and one which renders the term or appellation "floating-ring" particularly applicable, is that the internal diameter of the ring is somewhat greater than the external diameter of the rim of the wheel. I am perfectly aware that internal rings of various forms in cross-section have heretofore been employed, but in all such as have come under my observation, the internal diameter of the ring substantially agrees with the external diameter of the rim, or, in other words the difference between the diameters is only sufficient to permit the ring to slip laterally upon the rim, which latter it is supposed to more or less accurately fit and therefore rest upon. In my construction, however, I prefer to construct the ring with an internal diameter materially larger than the external diameter of the tread-portion of the rim, so that were the two placed one within the other and centered with relation to each other there would be quite an appreciable annular space between them.

In the present instance, the two opposite walls of the hollow or tubular rim 2 are at corresponding intervals provided with bolt-holes 14, through each pair of which are passed bolts 15. One end of each bolt terminates in an angularly disposed head 16, designed when turned outward to overlap and engage the clamping-ring 5, and at its other end is threaded to receive the usual nut 17. The diameter of the bolts may approximate the width of the space within the hollow rim, or it may be less, but if the former arrangement be preferred, and I have so illustrated it, the said bolts will very materially reinforce the outer wall of the hollow rim.

As before suggested, my invention is not confined to the clamping or mechanical fastening means herein shown and described, but, to the contrary, such means may be varied at will, the only essential being that such means be of such character as will cause the base of the tire to be thereby forced laterally so as to become engaged or clamped between such clamping-means and the sides of the floating-ring, the sides of the latter, it being understood being given such normal disposition or contour as agrees substantially with that of the walls of the base of the tire.

With the nuts 17 loosened and the bolts slightly retracted and the heads 16 turned inward, the clamping-ring 5, the tire, and internal floating-ring 9, may all be readily slipped laterally from the rim. On the other hand, these parts may be as readily returned to position upon the rim, the bolts partially rotated to reëngage the clamping-ring and the nuts retightened upon the bolts. Right at this point the very great importance of the floating-ring manifests itself, for it will undoubtedly occur that in tightening the nuts some will be rotated and hence tightened more than others with the result that at some points the bases of the tire are clamped or gripped more securely than at others. As will be readily appreciated this is objectionable for the tire is thereby held more or less insecurely. By having the ring 9 of somewhat greater diameter than the rim, however, it will be apparent that where the clamp is tightest the ring will be forced outward by the pressure of the internal inclined surfaces of the tire-base with the result that said ring will be to the same extent drawn inward at other points or where the pressure is lighter, said ring at all times resting or floating upon the inclined walls of the tire-base. It will thus be apparent that not only does the ring 9 adjust itself automatically to any irregularity in the tension of the clamping means, as mentioned, but in the event that the tire should become deflated from any cause, the same would flatten out upon the ring 9 and thus be supported away from the clamping means which latter it exceeds in diameter, so that the tire would escape rim cutting. It will also be evident that the ring 9 being supported by the inclined walls of the base of the tire, instead, as heretofore, by the unyielding rim of the wheel, somewhat of a cushion is provided which to some extent will absorb the shocks and reduce the wear and tear upon the deflated tire.

The ring 9 may or may not be compressible, as shown, and so far as this feature alone is concerned, the ring may be as shown or, as heretofore, made to accurately fit the rim. If, however, the ring is made compressible by the means shown or otherwise, then it will be apparent that its side-walls 12 will automatically adjust themselves to various makes of tires approximating this design but having bases the internal surfaces of which are disposed at more or less inclination.

If the side walls of the ring 9 are compressed, the beveled edges of the bottom of the ring will readily slip by one another or overlap; and when released from the pressure of the clamping-means, will spring back or return to their original normal inclination.

Having thus described my invention, what I claim is:

1. In a wheel, a rim tubular in cross-section and having one edge turned up to form a clamping-member and provided below the same at intervals with transverse registering bolt-holes, in combination with a removable ring located at the opposite side of the rim at which said turned up edge is located and forming the opposite clamping-member, and a series of bolts located in the bolt holes and terminating at one end beyond the rim in angular heads engaging the ring, said bolts being of a diameter agreeing with the space within the hollow rim whereby they reinforce the outer wall of said rim, and nuts for the ends of the bolts.

2. In a wheel, a tubular rim, clamping-means carried by the rim, bolts for the clamping-means passed laterally through corresponding openings formed in the opposite edges or walls of the rim and of a diameter agreeing with the distance between the walls of the rim, and nuts for the clamping-bolts.

3. The combination with a wheel embodying tire clamping-means, and a tire engaged by said means, of an internal tubular ring located between the bases of the tire and substantially wedge-shaped in cross-section, the inner wall of said ring being provided with an inclined slit thereby forming a lap-joint, whereby the side walls of the ring are capable of compression.

4. The combination with a wheel provided with a rim having at one side a fixed external clamping-wall, an opposite removable clamping-ring slightly larger than and mounted on the rim and free to slide laterally thereover, and transverse bolts for engaging the ring, of a tire having its edges engaged by the wall and ring, and an internal ring of greater diameter than the rim and combining with the latter to form an annular space and located between the tire edges, said internal ring being hollow and having its inner wall provided with a continuous annular slit the edges of which overlap.

5. The combination with a wheel embodying a rim, tire clamping means and a tire engaged by said means, of an internal tubular ring located between the base portions of the tire and comprising an upper wall, downwardly converging side walls and an intermediate lower wall, the latter being divided longitudinally, substantially as shown and described.

6. The combination with a wheel embodying a rim having clamping means and a tire engaged by said means, of a yielding tubular ring 9 of larger diameter than the rim to leave a space between the ring and rim, said ring being located between the lower edges of the tire and comprising an upper wall, downwardly converging side walls and an intermediate lower wall, the latter being divided longitudinally, substantially as shown and for the purpose set forth.

7. The combination with a wheel embodying a rim having clamping means and a tire engaged by said means, of a yielding tubular metal ring 9 of slightly larger diameter than the rim to leave a space between the rim and ring, said ring being located between the lower edges of the tire and comprising an upper wall, downwardly converging side walls and an intermediate lower wall, the latter being divided longitudinally and the upper wall disposed above the upper edges of the clamping means, substantially as shown and for the purposes set forth.

8. In a wheel, the combination, of a tubular rim, clamping means carried by the rim, bolts for the clamping means passed laterally through corresponding openings formed in the opposite sides or walls of the rim and of a diameter agreeing with the distance between the walls of the rim, and clamping nuts for the clamping bolts; together with an internal tubular ring of slightly larger diameter than the rim and comprising an upper wall, downwardly converging side walls and an intermediate lower wall, the latter being divided longitudinally, substantially as shown and described.

9. The combination, with a wheel provided with a flat rim having at one side a fixed external tire-clamping wall, an opposite clamping-ring slightly larger than and mounted on the rim and upon which rim it is free to move laterally, and transverse bolts carried by the wheel and engaging said ring, of a double tube tire having one of its edges engaged by the wall and its opposite edge engaged by said ring, and an internal ring of greater diameter than and mounted on the rim and combining with the latter to form a space and located between the tire-walls, said ring comprising an outer annular wall supporting the inner tube of the tire and opposite converging side-walls conforming to the terminals of the outer case.

10. The combination, with a wheel provided with a rim having at one side one member of an external tire-clamping means, an opposite clamping-ring slightly larger than and mounted on the rim and upon which rim said ring is free to move laterally and transverse bolts carried by the wheel and engaging said ring, of a double tube tire having one of its edges engaged by the said member of the external tire-clamping means and its opposite edge engaged by said ring, and an internal ring within the tire loosely fitting over and spaced from the rim, said internal ring comprising an outer transverse wall and opposite walls, the latter converging and conforming to the walls of the outer case.

In testimony whereof I have signed my name to this specification in the presence of two subscribing witnesses.

JOHN W. MEIXELL.

Witnesses:
PHILIP B. LINN,
WM. R. FOLLMER.